(12) United States Patent
Hasegawa et al.

(10) Patent No.: US 11,507,684 B2
(45) Date of Patent: Nov. 22, 2022

(54) κ-ANONYMIZATION DEVICE, METHOD, AND PROGRAM (71) Applicant: NIPPON TELEGRAPH AND TELEPHONE CORPORATION, Chiyoda-ku (JP)

(72) Inventors: Satoshi Hasegawa, Musashino (JP); Rina Okada, Musashino (JP); Shogo Masaki, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 338 days.

(21) Appl. No.: 16/652,225

(22) PCT Filed: Oct. 9, 2018

(86) PCT No.: PCT/JP2018/037596
§ 371 (c)(1),
(2) Date: Mar. 30, 2020

(87) PCT Pub. No.: WO2019/073967
PCT Pub. Date: Apr. 18, 2019

(65) Prior Publication Data
US 2020/0250332 A1 Aug. 6, 2020

(30) Foreign Application Priority Data
Oct. 11, 2017 (JP) .............................. JP2017-197365

(51) Int. Cl.
*G06F 21/62* (2013.01)
*G06F 16/901* (2019.01)

(52) U.S. Cl.
CPC ...... *G06F 21/6227* (2013.01); *G06F 16/9024* (2019.01)

(58) Field of Classification Search
CPC .............. G06F 21/602; G06F 21/6227; G06F 16/2246; G06F 21/6254; G06F 21/78;
(Continued)

(56) References Cited

U.S. PATENT DOCUMENTS 9,137,118 B2 * 9/2015 Himura .............. H04L 41/0853
9,870,381 B2 * 1/2018 Braghin .............. G06F 16/2228
(Continued)

OTHER PUBLICATIONS

International Search Report dated Dec. 18, 2018 in PCT/JP2018/037596, 2 pages.
(Continued)

*Primary Examiner* — Jung Liu
(74) *Attorney, Agent, or Firm* — Oblon, McClelland, Maier & Neustadt, L.L.P.

(57) ABSTRACT

A k-anonymization device includes: a list creation unit 1 that creates, based on generalization hierarchies about attribute values of attributes of a database, lists of values, each being obtained by generalizing each attribute value of each attribute of the database to each generalization level of the corresponding generalization hierarchy, and codes representing the values; a search unit 3 that searches for a node with k-anonymity of a lattice structure in parallel by determining whether a generalized database obtained by generalizing the database to generalization levels corresponding to each node of the lattice structure has k-anonymity based on the generalized database represented by the codes, which is obtained by referring to the created lists; and an output unit 4 that outputs a generalized database obtained by generalizing the database to generalization levels corresponding to a node with k-anonymity, which was found by the search, of the lattice structure.

6 Claims, 8 Drawing Sheets

(58) Field of Classification Search
CPC .................. G06F 16/245; G06F 16/00; G06F 2221/2115; G06F 16/9024; G06F 16/2228; G06F 16/21; H04L 9/14; G09C 1/00; H04W 4/02; H04W 4/21; H04W 4/029

See application file for complete search history.

(56) References Cited

U.S. PATENT DOCUMENTS

| 10,083,308 | B2* | 9/2018 | Jakobsson | H04L 9/3236 |
| 11,269,834 | B2* | 3/2022 | Braghin | G06F 9/5005 |
| 2009/0254572 | A1* | 10/2009 | Redlich | G06Q 10/107 |
| 2010/0162402 | A1* | 6/2010 | Rachlin | G06F 21/60 |
| | | | | 726/26 |
| 2010/0250497 | A1* | 9/2010 | Redlich | H04L 63/105 |
| | | | | 707/661 |
| 2013/0291128 | A1* | 10/2013 | Ito | G06F 21/6254 |
| | | | | 726/30 |
| 2013/0339359 | A1* | 12/2013 | Goyal | G06F 16/258 |
| | | | | 707/737 |
| 2014/0010109 | A1* | 1/2014 | Himura | H04L 41/12 |
| | | | | 370/254 |
| 2018/0131740 | A1* | 5/2018 | Ramamurthy | H04L 67/10 |
| 2019/0147770 | A1* | 5/2019 | Yoshino | G06F 21/602 |
| | | | | 713/193 |

OTHER PUBLICATIONS

Satoshi Hasegawa, et al., "Design and Evaluation of a Practically Efficient Anonymization Library for Large Scale Data" CSS 2017, Proceedings of Computer Security Symposium 2017, vol. 2017, No. 2, Oct. 2017, pp. 1342-1349 (with partial English translation).

Khaled El Emam, et al., "A Globally Optimal K-Anonymity Method for the De-Identification of Health Data" Journal of the American Medical Informatics Association, vol. 16, No. 5, Sep./Oct. 2009, pp. 670-682.

Florian Kohlmayer, et al., "Flash: Efficient, Stable and Optimal K-Anonymity" In Privacy, Security, Risk and Trust (PASSAT), 2012 International Conference on and 2012 International Conference on Social Computing (SocialCom), IEEE, 2012, pp. 708-717.

Kristen LeFevre, et al., "Incognito: Efficient Full-Domain K-Anonymity" In Proceedings of the 2005 ACM SIGMOD International Conference on Management of Data, 2005, pp. 49-60.

* cited by examiner

| ADDRESS | DATE OF BIRTH | GENDER |
|---|---|---|
| TOKYO, MUSASHINO-SHI, MIDORI-CHO, X-X-X | 1984/01/05 | MALE |
| KANAGAWA, YOKOSUKA-SHI, HIKARINO-OKA, Y-Y-Y | 1986/02/07 | MALE |
| KANAGAWA, ATSUGI-SHI, MORINOMIYA, Z-Z-Z | 1990/03/05 | MALE |

FIG. 3

| ADDRESS (LEVEL 0) | ADDRESS (LEVEL 1) | ADDRESS (LEVEL 2) | ADDRESS (LEVEL 3) | ADDRESS (LEVEL 4) |
|---|---|---|---|---|
| TOKYO, MUSASHINO-SHI, MIDORI-CHO, X-X-X | TOKYO, MUSASHINO-SHI, MIDORI-CHO | TOKYO, MUSASHINO-SHI | TOKYO | KANTO REGION |
| KANAGAWA, YOKOSUKA-SHI, HIKARINO-OKA, Y-Y-Y | KANAGAWA, YOKOSUKA-SHI, HIKARINO-OKA | KANAGAWA, YOKOSUKA-SHI | KANAGAWA | KANTO REGION |
| KANAGAWA, ATSUGI-SHI, MORINOMIYA, Z-Z-Z | KANAGAWA, ATSUGI-SHI, MORINOMIYA | KANAGAWA, ATSUGI-SHI | KANAGAWA | KANTO REGION |

CODING

| ADDRESS (LEVEL 0) | ADDRESS (LEVEL 1) | ADDRESS (LEVEL 2) | ADDRESS (LEVEL 3) | ADDRESS (LEVEL 4) |
|---|---|---|---|---|
| 0 | 0 | 0 | 0 | 0 |
| 1 | 1 | 1 | 1 | 0 |
| 2 | 2 | 2 | 1 | 0 |

FIG. 4

STEP S31: PREPARE AN EMPTY STACK.
STEP S32: PUSH A BOTTOM NODE OF THE LATTICE STRUCTURE ONTO THE STACK.
STEP S33: while IF THE STACK IS NOT EMPTY do
STEP S34:    POP A NODE FROM THE STACK.
STEP S35:    MARK THE POPPED NODE WITH A "SEARCHED" FLAG.
STEP S36:    GENERALIZE THE DATABASE TO GENERALIZATION LEVELS CORRESPONDING TO THE POPPED NODE BY REFERRING TO THE DATA HELD IN THE LISTS.
STEP S37:    if GENERALIZED DATABASE DOES NOT SATISFY k-ANONYMITY then
STEP S38:       PUSH A PARENT NODE, FOR WHICH A SEARCH IS YET TO BE CONDUCTED, OF PARENT NODES CONNECTED TO THE CURRENT NODE ONTO THE STACK.
STEP S39:    else SET THE CURRENT NODE AS A NODE THAT SATISFIES OPTIMAL k-ANONYMITY.
STEP S310:      RECURSIVELY MARK THE PARENT NODES CONNECTED TO THE CURRENT NODE WITH A "SEARCHED" FLAG BECAUSE THERE IS NO NEED TO CONDUCT A FURTHER SEARCH.
STEP S311:   end if
STEP S312: end while

FIG. 5

STEP S31: PREPARE AN EMPTY QUEUE.
STEP S32: PUT A BOTTOM NODE OF THE LATTICE STRUCTURE INTO THE QUEUE.
STEP S33: while IF THE QUEUE IS NOT EMPTY do
STEP S34:   TAKE A NODE FROM THE QUEUE.
STEP S35:   MARK THE NODE TAKEN FROM THE QUEUE WITH A "SEARCHED" FLAG.
STEP S36:   GENERALIZE THE DATABASE TO GENERALIZATION LEVELS CORRESPONDING TO THE NODE TAKEN
            FROM THE QUEUE BY REFERRING TO THE DATA HELD IN THE LISTS.
STEP S37:   if GENERALIZED DATABASE DOES NOT SATISFY k-ANONYMITY then
STEP S38:     PUT A PARENT NODE, FOR WHICH A SEARCH IS YET TO BE CONDUCTED, OF PARENT NODES
              CONNECTED TO THE CURRENT NODE INTO THE QUEUE.
STEP S39:   else SET THE CURRENT NODE AS A NODE THAT SATISFIES OPTIMAL k-ANONYMITY.
STEP S310:    RECURSIVELY MARK THE PARENT NODES CONNECTED TO THE CURRENT NODE WITH A
              "SEARCHED" FLAG BECAUSE THERE IS NO NEED TO CONDUCT A FURTHER SEARCH.
STEP S311:  end if
STEP S312: end while

κ-ANONYMIZATION DEVICE, METHOD, AND PROGRAM

TECHNICAL FIELD

This invention relates to a technique of concealing a database.

BACKGROUND ART

As techniques of concealing individual data of a database by a deterministic technique, there are Non-patent Literatures 1 to 3. In concealment processing of these Non-patent Literatures 1 to 3, by performing generalization processing or record deletion on data, the data is processed so that k or more identical records exist (k-anonymity). This processing is called k-anonymization.

The generalization processing is generalizing data. For example, "an apple" is generalized to "fruit" and "age 13" is generalized to "a teenager". In many of the types of generalization processing, a tree structure, which is called a generalization hierarchy, indicating the generalized and specialized relationship between values is prepared and processing is performed by performing coding of a value by following the path of the tree structure. For instance, in generalization processing, processing to raise the level of the generalization hierarchy is performed.

Figure 7:
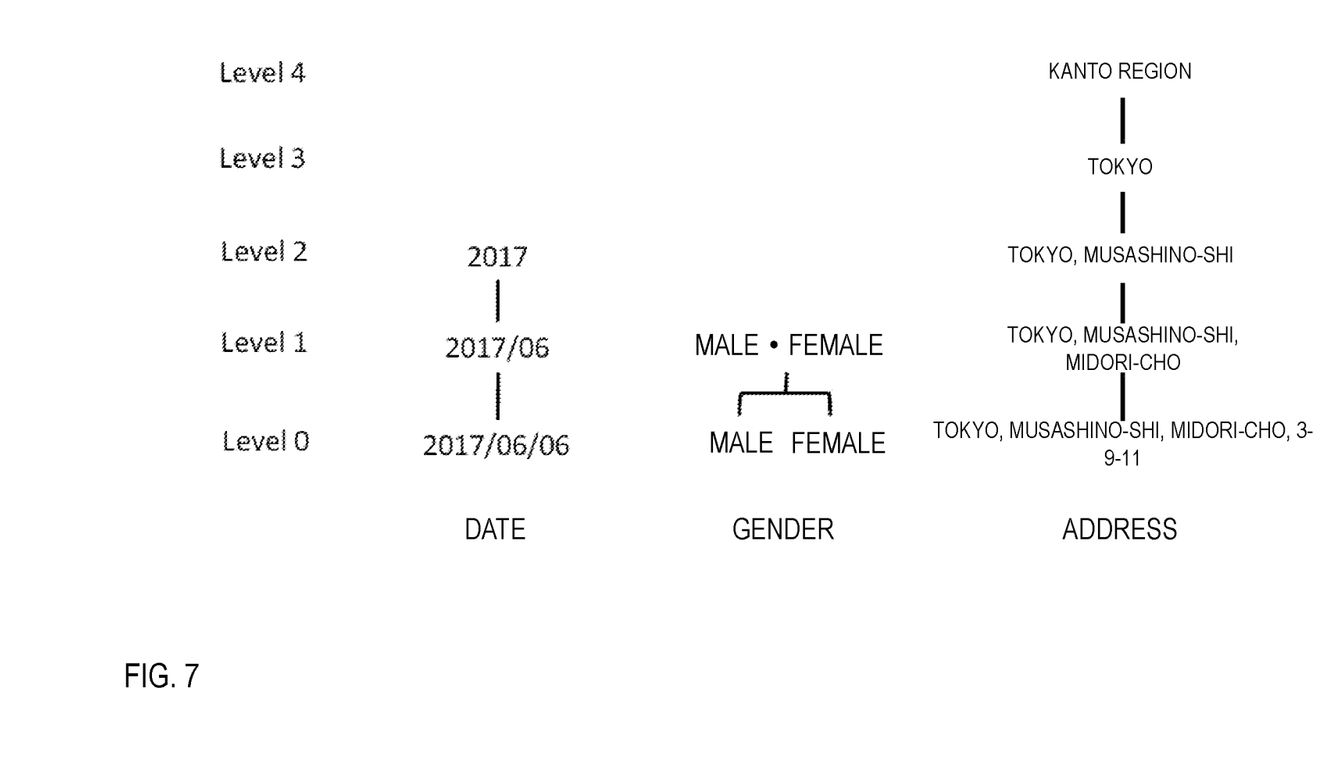
FIG. 7 is a diagram showing an example of a generalization hierarchy.

In FIG. 7, an example of the generalization hierarchy is shown. FIG. 7 shows examples of generalization hierarchies about a date, gender, and an address.

In many of the existing techniques, minimum generalization and deletion processing that satisfies k-anonymity is performed. This corresponds to selecting, from combinations of ways to raise the generalization levels of attributes, a combination that requires the smallest number of operations of generalization and deletion processing. This is also called optimal k-anonymization. If a set of the generalization levels of attributes is assumed to be a node, the combinations of ways to raise the levels can be expressed as a lattice structure. Optimal k-anonymization is a problem of efficiently searching the lattice structure for a node on which optimal k-anonymization is performed.

Figure 8:
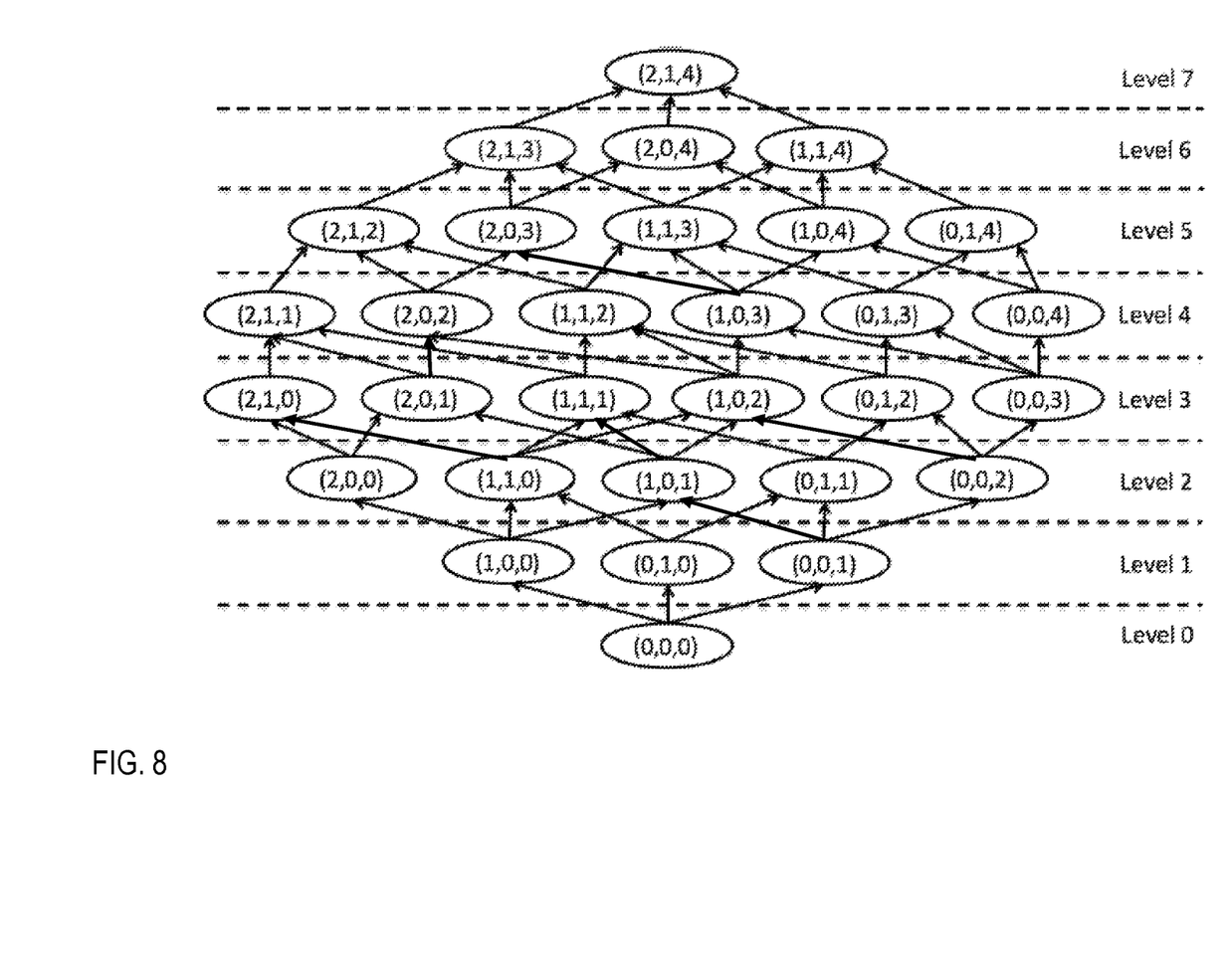
FIG. 8 is a diagram showing an example of a lattice structure.

In FIG. 8, an example of the lattice structure is shown. FIG. 8 is an example of the lattice structure of the levels of the generalization hierarchies about a date (depth 3), gender (depth 2), and an address (depth 5) shown in FIG. 7. (0, 0, 0) are the values of a date, gender, and an address at level 0; for example, the values are (1, 0, 0) when the level of a date is raised by one tier. The level of the lattice shown on the right side of FIG. 8 indicates how many times the level was raised.

This search problem has been demonstrated to be NP-hard, and various methods of heuristically and efficiently executing this problem have been studied (for example, see Non-patent Literatures 1 to 3). These algorithms achieve an increase in efficiency by narrowing a search space in a lattice structure based on the property: "if a certain node in a lattice structure satisfies k-anonymity, an arbitrary higher-order node also satisfies k-anonymity".

PRIOR ART LITERATURE

Non-Patent Literature

Non-patent Literature 1: Khaled El Emam, Fida Kamal Dankar, Romeo Issa, Elizabeth Jonker, Daniel Amyot, Elise Cogo, Jean-Pierre Corriveau, Mark Walker, Sadrul Chowdhury, Regis Vaillancourt, et al. "A globally optimal k-anonymity method for the de-identification of health data. Journal of the American Medical Informatics Association", Vol. 16, No. 5, pp. 670-682, 2009.

Non-patent Literature 2: Florian Kohlmayer, Fabian Prasser, Claudia Eckert, Alfons Kemper, and Klaus A Kuhn. "Flash: efficient, stable and optimal k-anonymity", In Privacy, Security, Risk and Trust (PASSAT), 2012 International Conference on and 2012 International Conference on Social Computing (SocialCom), pp. 708-717. IEEE, 2012.

Non-patent Literature 3: Kristen LeFevre, David J DeWitt, and Raghu Ramakrishnan. "Incognito: Efficient full-domain k-anonymity", In Proceedings of the 2005 ACM SIGMOD international conference on Management of data, pp. 49-60, 2005.

SUMMARY OF THE INVENTION

Problems to be Solved by the Invention

It is expected that large-scale data will also be anonymized due to the current big data boom. The problem of the existing techniques is that, at the time of concealment processing, the processing time and memory usage are increased with an increase in the number of records or the number of attributes. More specifically, an increase in the number of records results in a linear increase in the time required for generalization processing and memory usage, and an increase in the number of attributes causes nodes in a lattice structure to exponentially increase in number; as a result, it takes time to find a potential optimal k-anonymization node by searching the lattice structure.

An object of this invention is to provide k-anonymization device, method, and program that perform k-anonymization in a practical processing time with reduced memory consumption compared to the existing techniques.

Means to Solve the Problems

A k-anonymization device according to an aspect of this invention includes: a list creation unit that creates, based on generalization hierarchies about attribute values of attributes of a database, lists of values, each being obtained by generalizing each attribute value of each attribute of the database to each generalization level of the corresponding generalization hierarchy, and codes representing the values; a list storage in which the created lists are stored; a search unit that searches for a node with k-anonymity, based on the assumption that a lattice structure is made up of nodes representing generalization levels of the attributes of the database, of the lattice structure in parallel by determining whether a generalized database obtained by generalizing the database to generalization levels corresponding to each node of the lattice structure has k-anonymity based on the generalized database represented by the codes, which is obtained by referring to the lists read from the list storage; and an output unit that outputs a generalized database obtained by generalizing the database to generalization levels corresponding to a node with k-anonymity, which was found by the search, of the lattice structure.

Effects of the Invention

It is possible to perform k-anonymization in a practical processing time with reduced memory consumption compared to the existing techniques.

DETAILED DESCRIPTION OF THE EMBODIMENTS

Hereinafter, an embodiment of this invention will be described with reference to the drawings.

Figure 1:
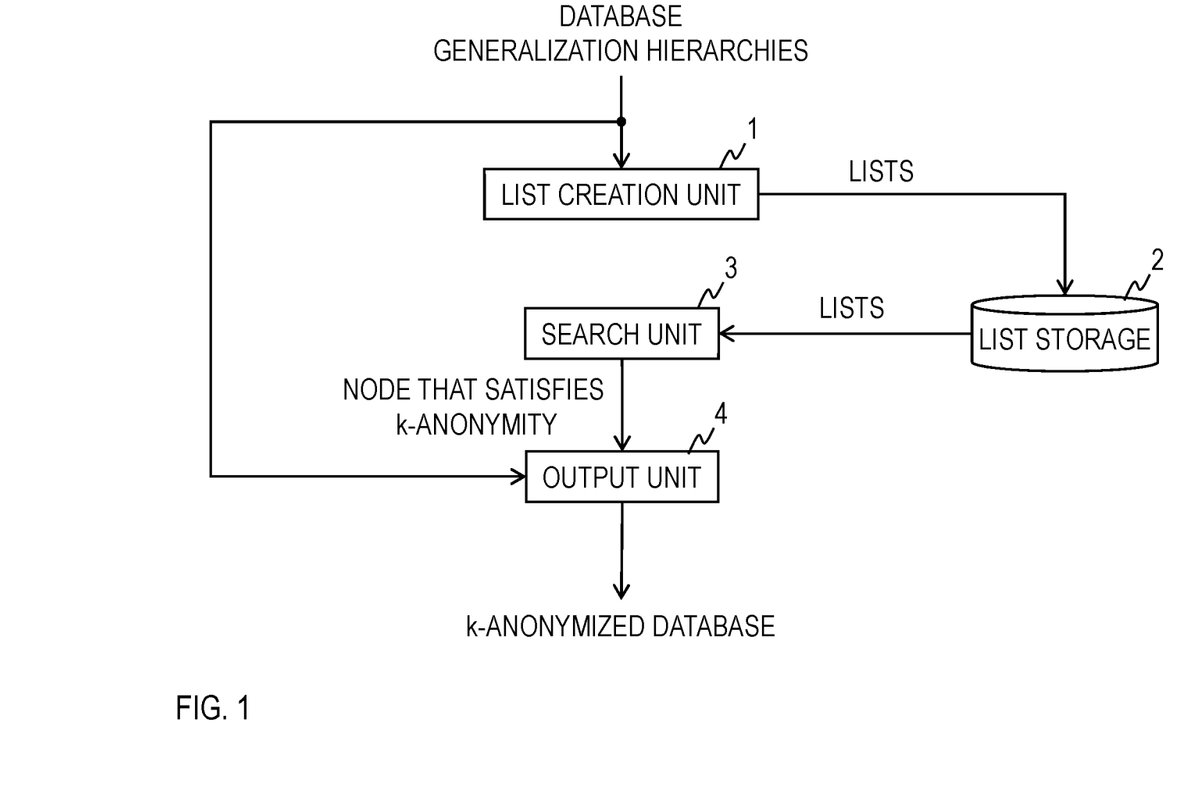
FIG. 1 is a block diagram showing an example of a k-anonymization device.

As shown in FIG. 1, a k-anonymization device includes, for example, a list creation unit 1, a list storage 2, a search unit 3, and an output unit 4.

Figure 2:
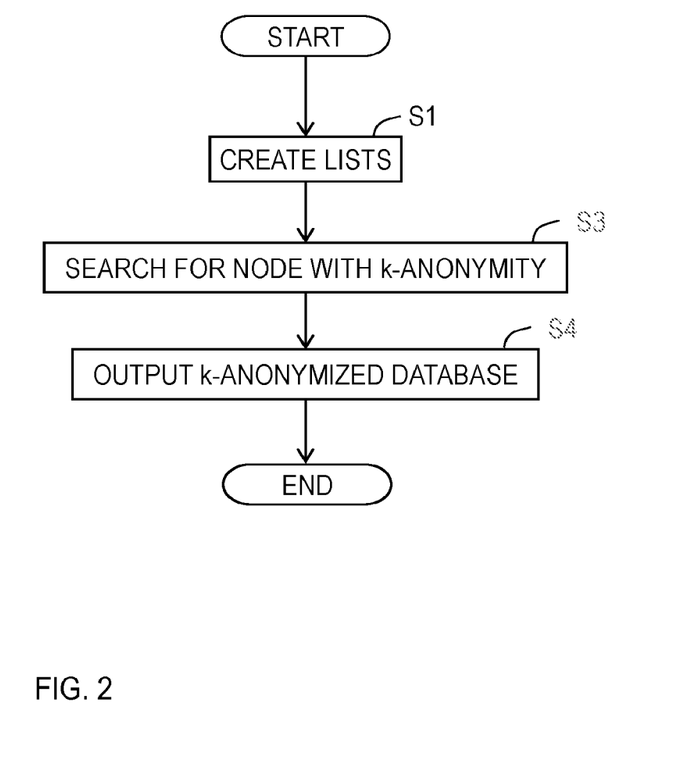
FIG. 2 is a flow diagram showing an example of a k-anonymization method.

A k-anonymization method is implemented by the units of the k-anonymization device which perform processing of Step S1 to Step S4 illustrated in FIG. 2 and in the following description.

A database on which k-anonymization is to be performed is, for example, a column-oriented database or a database on which column-oriented data management is performed. The database on which k-anonymization is to be performed may be a database in which data is stored on a column-by-column basis and each column portion is compressed. The database on which k-anonymization is to be performed may be a normal file-type database or a database that operates on memory.

<List Creation Unit 1>

Figure 3:
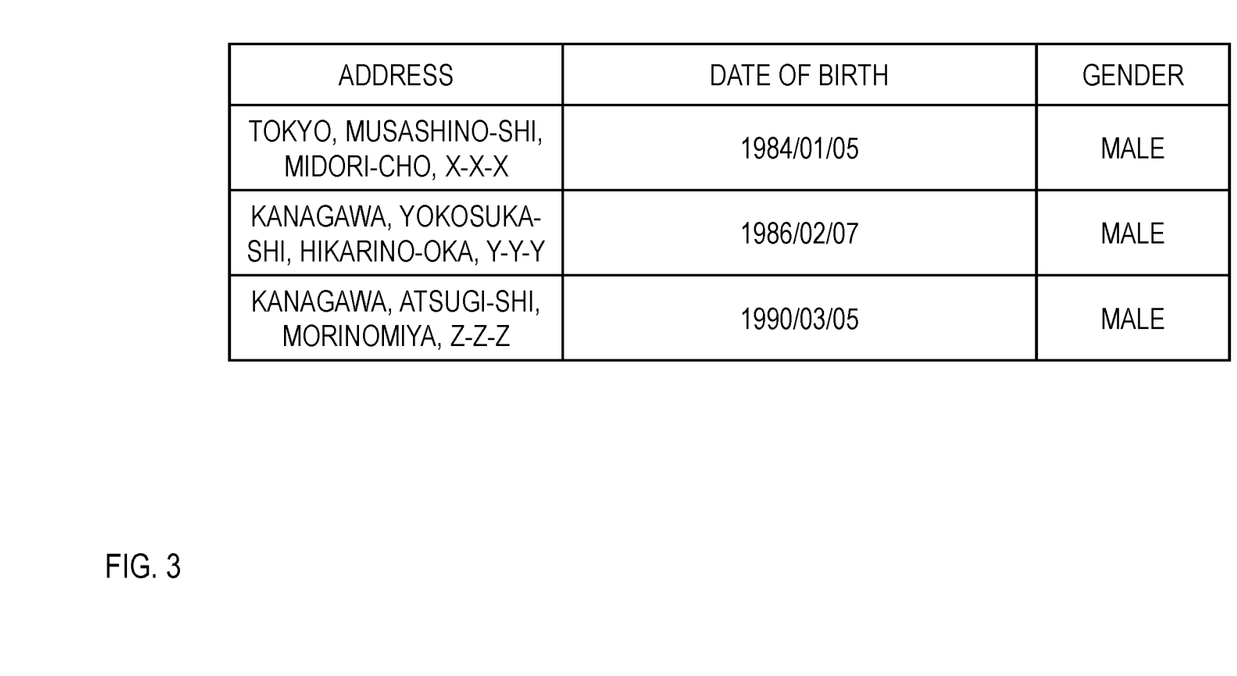
FIG. 3 is a diagram showing an example of a database.

A database on which k-anonymization is to be performed and generalization hierarchies about attribute values of attributes of the database are input to the list creation unit 1. An example of the database and an example of the generalization hierarchy are respectively shown in FIG. 3 and FIG. 7.

The list creation unit 1 performs precomputations of data at each generalization level.

In other words, the list creation unit 1 creates, based on the generalization hierarchies about the attribute values of the attributes of the database, lists of values, each being obtained by generalizing each attribute value of each attribute of the database to each generalization level of the corresponding generalization hierarchy, and codes representing the values. The created lists are stored in the list storage 2.

In so doing, if the database is compressed, the list creation unit 1 decompresses the database and creates lists based on the decompressed database.

Hereinafter, processing which is performed in the list creation unit 1 will be described in detail.

For example, if the database is a column-oriented database and a database in which each column portion is compressed, the list creation unit 1 first extracts one column from the database and decompresses the extracted one column, and thereby obtains attribute values of an attribute of that column. For instance, assume that three attribute values, "Tokyo, Musashino-shi, Midori-cho, X-X-X", "Kanagawa, Yokosuka-shi, Hikarino-oka, Y-Y-Y", and "Kanagawa, Atsugi-shi, Morinomiya, Z-Z-Z", from an attribute "address" in the first column of the database of FIG. 3.

Then, by using the input generalization hierarchies, the list creation unit 1 obtains values, each being obtained by generalizing each attribute value thus obtained to each generalization level of the corresponding generalization hierarchy. For example, assume that, as shown in an upper diagram of FIG. 4, "Tokyo, Musashino-shi, Midori-cho, X-X-X" is obtained as a value obtained by generalizing the attribute value "Tokyo, Musashino-shi, Midori-cho, X-X-X" to generalization level 0 of the generalization hierarchy about an address, "Tokyo, Musashino-shi, Midori-cho" is obtained as a value obtained by generalizing the attribute value "Tokyo, Musashino-shi, Midori-cho, X-X-X" to generalization level 1 of the generalization hierarchy about an address, "Tokyo, Musashino-shi" is obtained as a value obtained by generalizing the attribute value "Tokyo, Musashino-shi, Midori-cho, X-X-X" to generalization level 2 of the generalization hierarchy about an address, "Tokyo" is obtained as a value obtained by generalizing the attribute value "Tokyo, Musashino-shi, Midori-cho, X-X-X" to generalization level 3 of the generalization hierarchy about an address, and "the Kanto region" is obtained as a value obtained by generalizing the attribute value "Tokyo, Musashino-shi, Midori-cho, X-X-X" to generalization level 4 of the generalization hierarchy about an address.

Then, the list creation unit 1 creates lists of values (character strings in an example of FIG. 4) of the generalized data and codes representing the values. In so doing, by expressing the generalized value as a 1-byte code if the number of unique character strings of the generalized data is 255 or less, expressing the generalized value as a 2-byte code if the number of unique character strings of the generalized data is 65535 or less, and expressing the generalized value as a 4-byte code if the number of unique character strings of the generalized data is 4294967295 or less, it is possible to cut down memory consumption.

Figure 4:
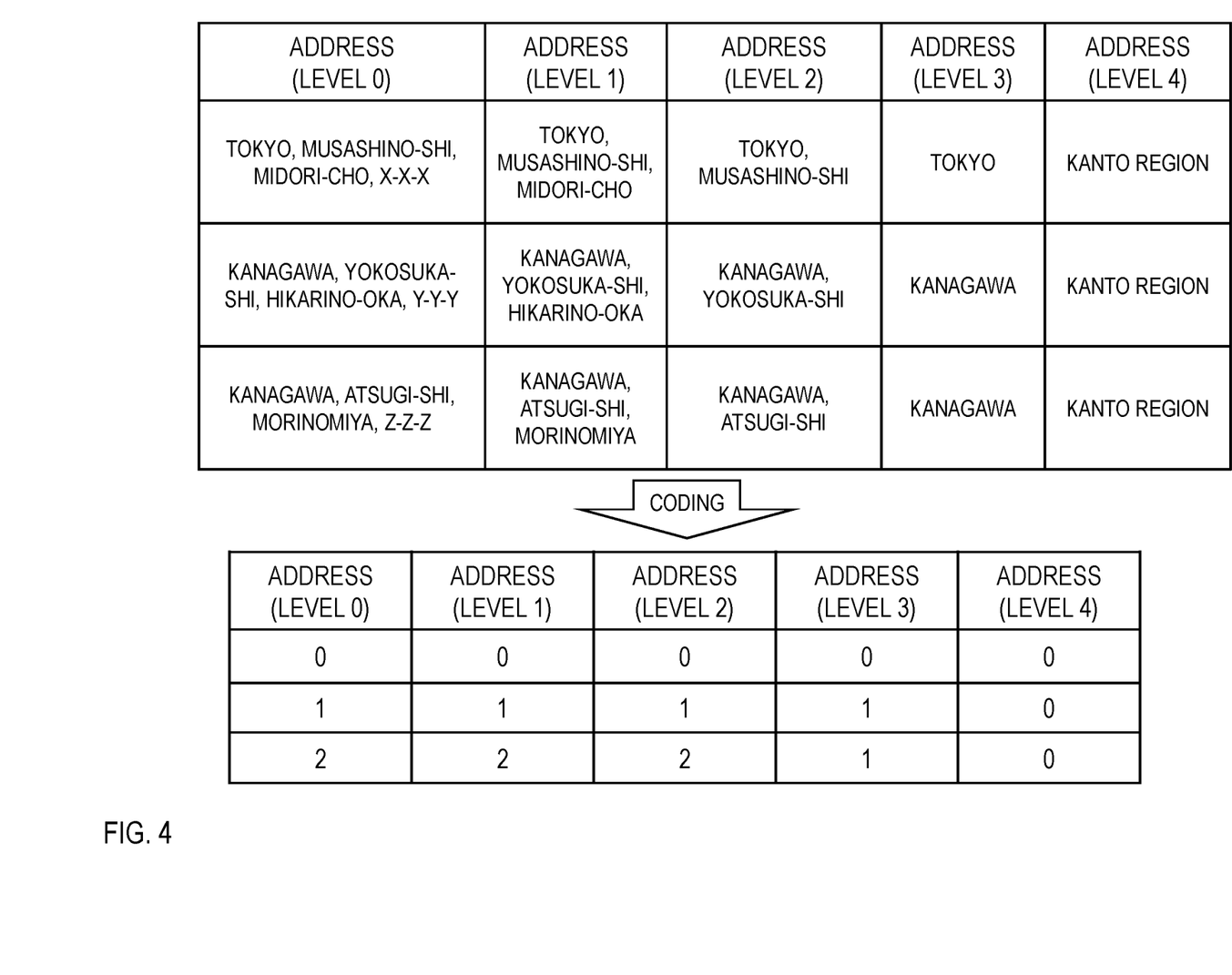
FIG. 4 is a diagram showing examples of coding and lists.

Coding is performed on a generalization level-by-generalization level basis. For instance, in FIG. 4, the generalized values at generalization level 2 of the generalization hierarchy about an address are three values: "Tokyo, Musashino-shi", "Kanagawa, Yokosuka-shi", and "Kanagawa, Atsugi-shi". Thus, the generalized values at generalization level 2 of the generalization hierarchy about an address can be expressed as 1-byte codes. In FIG. 4, a code "0" is assigned to "Tokyo, Musashino-shi", a code "1" is assigned to "Kanagawa, Yokosuka-shi", and a code "2" is assigned to "Kanagawa, Atsugi-shi".

Moreover, in FIG. 4, the generalized values at generalization level 3 of the generalization hierarchy about an address are two values: "Tokyo" and "Kanagawa". Thus, the generalized values at generalization level 3 of the generalization hierarchy about an address can be expressed as 1-byte codes. In FIG. 4, a code "0" is assigned to "Tokyo" and a code "1" is assigned to "Kanagawa".

FIG. 4 shows examples of lists based on the generalization hierarchies about an address. The list creation unit 1 creates lists based on the generalization hierarchies about attributes by performing the above-described processing on each attribute of the database.

<List Storage 2>

The lists based on the generalization hierarchies about attributes, which are created in the list creation unit 1, are stored in the list storage 2.

<Search Unit 3>

The search unit 3 searches for a node with k-anonymity of a lattice structure in parallel by determining whether a generalized database obtained by generalizing the database to generalization levels corresponding to each node of the lattice structure has k-anonymity based on the generalized database represented by codes, which is obtained by referring to the lists read from the list storage 2 (Step S3). A node with k-anonymity, which was found by the search, of the lattice structure is output to the output unit 4.

Here, the lattice structure is made up of nodes representing the generalization levels of the attributes of the database. An example of the lattice structure is a lattice structure shown in FIG. 8.

Figure 5:
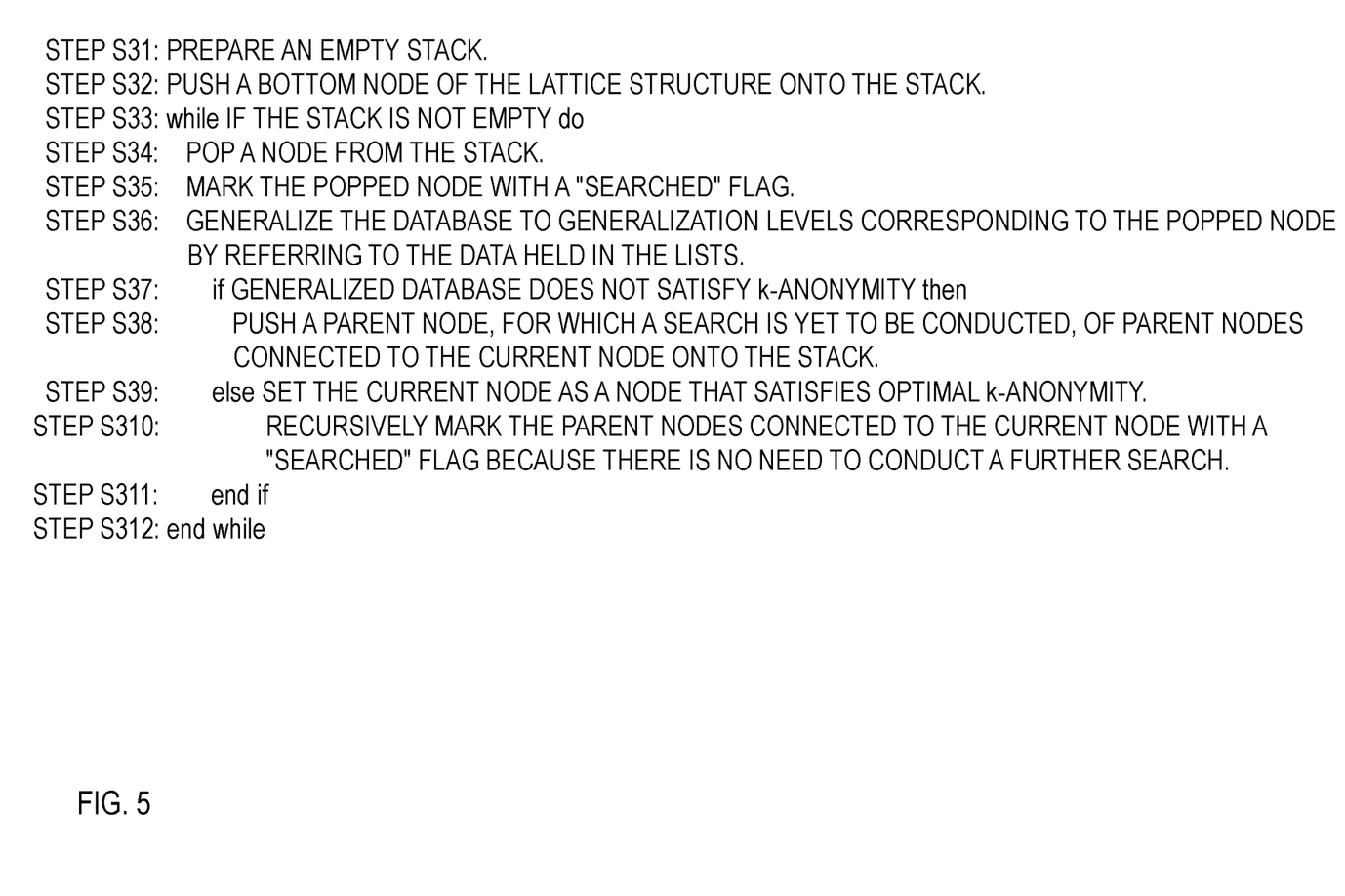
FIG. 5 is a diagram showing an example of an algorithm for a depth-first search.

For example, the search unit 3 conducts a depth-first search on the nodes of the lattice structure in parallel. In FIG. 5, an example of an algorithm for a depth-first search is shown. The search unit 3 performs processing from Step S31 to Step S312.

In Step S31, the search unit 3 performs processing "Prepare an empty stack."

In Step S32, the search unit 3 performs processing "Push a bottom node of the lattice structure onto the stack."

In Step S33, the search unit 3 determines whether the stack is empty. If the stack is not empty, processing from Step S34 to Step S311 is performed. If the stack is empty, the processing is ended.

In Step S34, the search unit 3 performs processing "Pop a node from the stack."

In Step S35, the search unit 3 performs processing "Mark the popped node with a "searched" flag."

In Step S36, the search unit 3 performs processing "Generalize the database to generalization levels corresponding to the popped node by referring to the data held in the lists." In other words, in Step S36, the search unit 3 performs processing to obtain a generalized database represented by codes by referring to the lists read from the list storage 2. By using the lists obtained in advance, it is possible to reduce the amount of memory consumed when generalization processing is performed.

In Step S37, the search unit 3 determines whether the generalized database represented by codes and obtained by generalizing the database to the generalization levels corresponding to the popped node does not satisfy k-anonymity. In so doing, the search unit 3 only has to perform cross tabulation by combining the coded data and evaluate a minimum cross tabulation value as a k-value of k-anonymity. If there is a need to make a deletion, the search unit 3 only has to delete a record that does not satisfy k-anonymity and evaluate k-anonymity again.

If the generalized database represented by codes does not satisfy k-anonymity, processing in Step S38 is performed. If the generalized database represented by codes satisfies k-anonymity, processing in Step S39 and Step S310 is performed.

In Step S38, the search unit 3 performs processing "Push a parent node, for which a search is yet to be conducted, of parent nodes connected to the current node onto the stack."

In Step S39, the search unit 3 performs processing "Set the current node as a node that satisfies optimal k-anonymity."

In Step S310, the search unit 3 performs processing "Recursively mark the parent nodes connected to the current node with a "searched" flag because there is no need to conduct a further search."

Since processing in a while loop from Step S33 to Step S312 is independent processing, it is possible to conduct an efficient search using a plurality of threads. In other words, the search unit 3 can perform processing in the while loop in parallel on the nodes in the stack.

To achieve a further increase in efficiency, the search unit 3 can use a thread-safe stack, for example. By doing so, the search unit 3 does not have to explicitly acquire a lock, which makes more efficient execution possible. Examples of the thread-safe stack include BlockingDeque in Java (a registered trademark).

Figure 6:
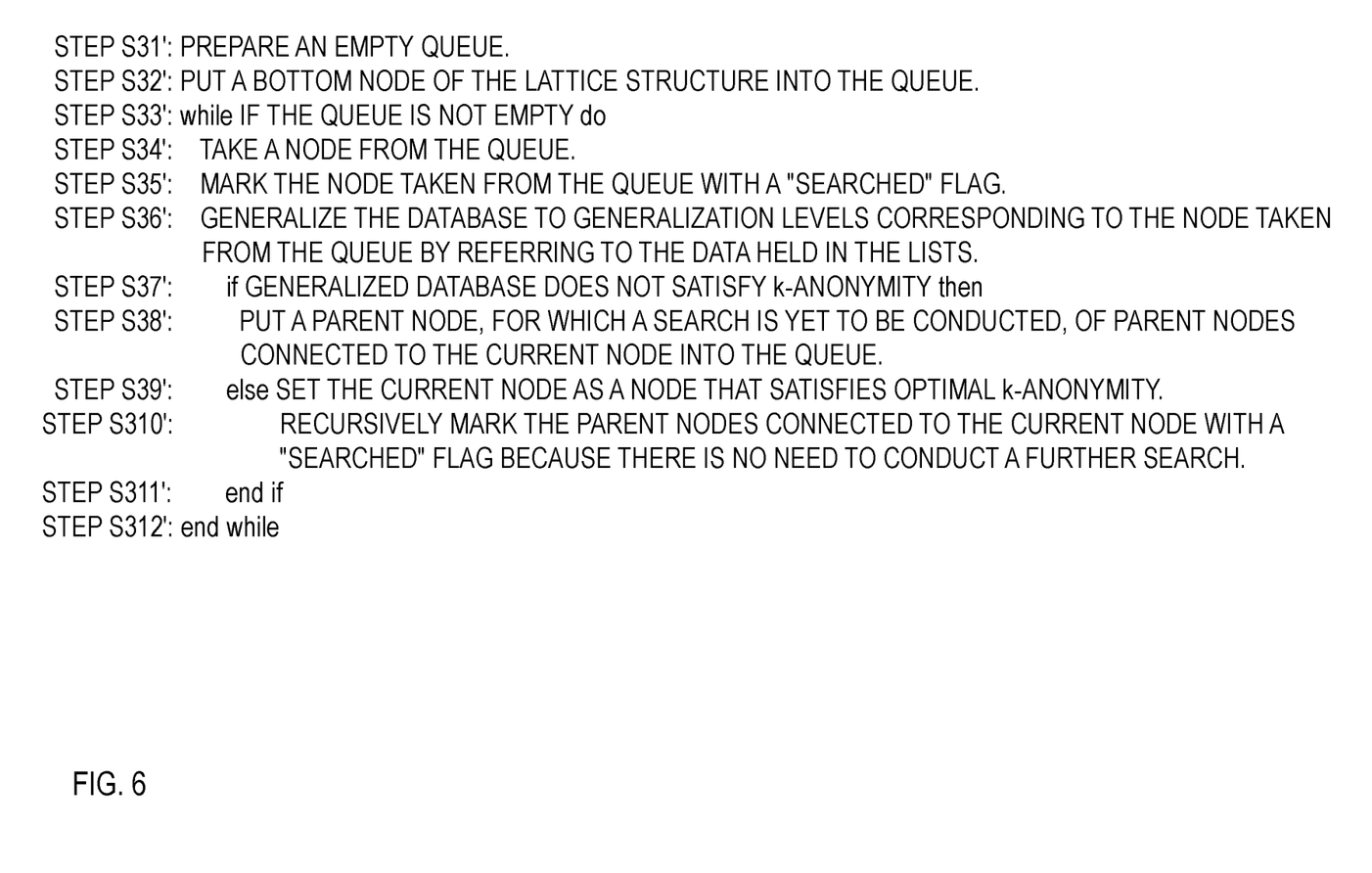
FIG. 6 is a diagram showing an example of an algorithm for a width-first search.

The search unit 3 may conduct a width-first search on the nodes of the lattice structure in parallel. In FIG. 6, an example of an algorithm for a width-first search is shown. The search unit 3 performs processing from Step S31' to Step S312'. The algorithm for a width-first search is the same as the algorithm for a depth-first search of FIG. 5 except that a stack is changed to a queue.

<Output Unit 4>

The database, the generalization hierarchies, and the node with k-anonymity, which was found by the search conducted by the search unit 3, of the lattice structure are input to the output unit 4.

First, the output unit 4 generalizes the database to generalization levels corresponding to the node with k-anonymity, which was found by the search conducted by the search unit 3, of the lattice structure by using the database and the generalization hierarchies. Then, the output unit 4 outputs the generalized database, in other words, the k-anonymized database.

In this way, the output unit 4 outputs the generalized database obtained by generalizing the database to generalization levels corresponding to the node with k-anonymity, which was found by the search conducted by the search unit 3, of the lattice structure (Step S4).

If there are a plurality of nodes with k-anonymity, which were found by the search conducted by the search unit 3, of the lattice structure, the output unit 4 outputs the generalized database obtained by generalizing the database to generalization levels corresponding to each of at least one of the plurality of nodes.

One of the points of the above-described embodiment is that another coding processing is performed when generalization processing is performed by precomputations which are performed in the list creation unit 1. This allows the search unit 3 to perform processing on the generalized database represented by codes, which makes it possible to reduce memory consumption in processing which is performed in the search unit 3.

In the existing techniques, that is, when processing using a single thread is performed, performing generalization processing as appropriate reduces the amount of memory consumed. However, if the existing techniques are simply applied to processing using a plurality of threads, since a plurality of operations of generalization processing are concurrently performed at the same time due to parallelization, there is a possibility that a large amount of memory is temporarily consumed. For this reason, as in the above-described embodiment, data subjected to coding and generalization compactly only one time is held and referred to at the time of parallel processing which is performed in the search unit 3. Thus, the above-described embodiment has an advantage that, even when the number of operations of parallel processing is increased, the amount of memory consumed is not increased in proportion to the number of operations of parallel processing. For example, in the case of FIG. 7, three pieces of generalized data on a date, two pieces of generalized data on gender, and five pieces of generalized data on an address are obtained.

[Programs and Recording Media]

For example, when processing which is performed in each unit of the k-anonymization device is implemented by a computer, the processing details of a function each unit of the k-anonymization device should possess are described by a program. By running this program on the computer, the processing which is performed in each unit is implemented on the computer.

The program describing the processing details may be recorded on a computer-readable recording medium. The computer-readable recording medium may be any kind of media, such as a magnetic recording device, an optical disk, a magneto-optical recording medium, and semiconductor memory.

Processing of each unit may be configured through execution of a predetermined program on a computer or at least part of the processing thereof may be embodied in hardware.

It will be appreciated that modifications may be made as appropriate without departing from the scope of the present invention.

What is claimed is:

1. A k-anonymization device comprising:
   processing circuitry configured to:
   create, based on generalization hierarchies about attribute values of attributes of a database, lists of values, each being obtained by generalizing each attribute value of each attribute of the database to each generalization level of the corresponding generalization hierarchy, and codes representing the values;
   store the created lists in a memory;
   search for a node with k-anonymity, based on an assumption that a lattice structure is made up of nodes representing generalization levels of the attributes of the database, of the lattice structure in parallel by determining whether a generalized database obtained by generalizing the database to generalization levels corresponding to each node of the lattice structure has k-anonymity based on the generalized database represented by the codes, which is obtained by referring to the lists read from the memory; and
   output a generalized database obtained by generalizing the database to generalization levels corresponding to a node with k-anonymity, which was found by the search, of the lattice structure.

2. The k-anonymization device according to claim 1, wherein
   when the database is compressed, the processing circuitry decompresses the database and creates the lists based on the decompressed database.

3. The k-anonymization device according to claim 1 or 2, wherein
   the processing circuitry conducts a depth-first search for a node with k-anonymity of the lattice structure in parallel.

4. The k-anonymization device according to claim 1 or 2, wherein
   the unit processing circuitry conducts a width-first search for a node with k-anonymity of the lattice structure in parallel.

5. A k-anonymization method, implemented by processing circuitry of a k-anonymization device, comprising:
   a list creation step in which the processing circuitry creates, based on generalization hierarchies about attribute values of attributes of a database, lists of values, each being obtained by generalizing each attribute value of each attribute of the database to each generalization level of the corresponding generalization hierarchy, and codes representing the values;
   a search step in which the processing circuitry searches for a node with k-anonymity, based on an assumption that a lattice structure is made up of nodes representing generalization levels of the attributes of the database, of the lattice structure in parallel by determining whether a generalized database obtained by generalizing the database to generalization levels corresponding to each node of the lattice structure has k-anonymity based on the generalized database represented by the codes, which is obtained by referring to the created lists; and
   an output step in which the processing circuitry outputs a generalized database obtained by generalizing the database to generalization levels corresponding to a node with k-anonymity, which was found by the search, of the lattice structure.

6. A non-transitory computer-readable storage medium storing instructions which when executed cause a computer function as the k-anonymization device according to claim 1.

* * * * *